US012762173B1

(12) United States Patent
Ampe

(10) Patent No.: US 12,762,173 B1
(45) Date of Patent: Oct. 13, 2026

(54) SYSTEM AND METHOD FOR AGGREGATING, CATEGORIZING AND VALIDATING SOCIAL MEDIA POSTS

(71) Applicant: Jonathan Jacques M. Ampe, Key Biscayne, FL (US)

(72) Inventor: Jonathan Jacques M. Ampe, Key Biscayne, FL (US)

( * ) Notice: Subject to any disclaimer, the term of this patent is extended or adjusted under 35 U.S.C. 154(b) by 0 days.

(21) Appl. No.: 18/680,064

(22) Filed: May 31, 2024

Related U.S. Application Data

(60) Provisional application No. 63/636,256, filed on Apr. 19, 2024, provisional application No. 63/469,976, filed on May 31, 2023.

(51) Int. Cl.
*G06F 16/353* (2025.01)
*G06Q 10/40* (2026.01)
*H04L 51/52* (2022.01)
*H04L 67/50* (2022.01)

(52) U.S. Cl.
CPC ........... *G06F 16/353* (2019.01); *G06Q 10/40* (2026.01); *H04L 51/52* (2022.05); *H04L 67/535* (2022.05)

(58) Field of Classification Search
CPC ........ G06F 16/353; G06F 11/34; H04L 51/52; H04L 67/535; H04L 43/00; G06Q 50/01
See application file for complete search history.

(56) References Cited

U.S. PATENT DOCUMENTS 9,087,297 B1 * 7/2015 Filippova ................ G06F 16/70
10,108,674 B1 * 10/2018 Kolcz ..................... H04L 67/53
10,614,469 B1 * 4/2020 Lepeska ................ G06F 16/583
2005/0060643 A1 * 3/2005 Glass .................... H04L 51/212 715/205
2013/0024454 A1 * 1/2013 Dunn .................... G06F 16/907 707/E17.046
2014/0253727 A1 * 9/2014 Sadrieh .............. H04N 21/2743 348/143
2014/0310062 A1 * 10/2014 Klein ................. G06Q 30/0203 705/7.32
2015/0020151 A1 * 1/2015 Ramanathan ........... G06F 21/10 726/1

(Continued)

*Primary Examiner* — Vaishali Shah

(74) *Attorney, Agent, or Firm* — MALLOY & MALLOY, P.L.

(57) ABSTRACT

The present invention provides a comprehensive system and method for aggregating, categorizing, and validating social media posts to enhance the reliability and trustworthiness of shared information. The system includes a user interface for creating and interacting with posts, a categorization module for classifying posts into predefined content types, and a challenge module for users to contest post categorizations. The verification module reviews and updates challenged posts, while the notification module informs users of changes. Additionally, the system features a storage module for retaining posts and verification data, and a display module for presenting categorized posts. The invention promotes accountability among content creators through community-based moderation and automated algorithms, incorporating machine learning for improved accuracy. It supports dynamic updates to content types based on user feedback, ensuring adaptability to evolving trends. This system mitigates misinformation, fostering a trustworthy social media environment.

5 Claims, 13 Drawing Sheets

(56) References Cited

U.S. PATENT DOCUMENTS

| | | | | |
|---|---|---|---|---|
| 2016/0162575 | A1* | 6/2016 | Eck | G06F 40/58<br>707/776 |
| 2020/0104628 | A1* | 4/2020 | Rajamohan | G06F 18/217 |
| 2020/0372067 | A1* | 11/2020 | Otero | G06F 16/48 |

* cited by examiner

Fig. 12
100
Involved Parties
Government
Non-profit media
For-profit media
Political Organization
All 47
Educational Organization
Government media
International Organization
Private Org.
NGO
236
240

SYSTEM AND METHOD FOR AGGREGATING, CATEGORIZING AND VALIDATING SOCIAL MEDIA POSTS

BACKGROUND OF THE INVENTION

Claim of Priority

This application claims the benefit of United States Provisional Patent Application 63/469,976 filed on May 31, 2023, and U.S. Provisional Patent Application 63/636,256 filed on Apr. 19, 2024, respectively, which are incorporated by reference herein in their entirety.

FIELD OF THE INVENTION

The present invention relates to social media platforms, specifically to systems and methods for aggregating, categorizing, and validating social media posts. The invention aims to enhance the reliability and trustworthiness of information shared on social media by providing tools for users to accurately classify and verify the nature of the content they encounter.

DESCRIPTION OF THE RELATED ART

Since the advent of the internet, the manner in which news is consumed has shifted significantly. Initially, news was predominantly accessed through traditional media channels such as print, radio, and television. However, with the rise of the internet, particularly in the last years, there has been a notable shift towards online news consumption. Network-based sharing platforms, commonly referred to as social media, have become critical sources of news and information for a large segment of the population. These platforms, including Facebook, Twitter, Instagram, YouTube, TikTok, Snapchat, Quora, Reddit, Twitch, LinkedIn, Discord, Parler, Tumblr, Truth, and others, connect people globally and allow for the sharing of various forms of content such as text, images, videos, blogs, business updates, Q&A sessions, and more. Despite their initial design for social interaction, these platforms have evolved into significant news distribution channels. The open environment of these platforms permits users to share nearly anything, resulting in a rich and diverse ecosystem for news and information dissemination.

The popularity of social media for news consumption can be attributed to several factors. Unlike traditional media, where editors decide which topics to cover and which opinions to publish, social media empowers users to share content on any topic, offering a wide range of perspectives and opinions. This user-driven approach creates the impression of more comprehensive access to information. Additionally, social media news is typically free and presented in short, easily digestible formats, which appeals to modern consumers' preferences for quick and accessible information.

However, the very nature of social media platforms, characterized by rapid content dissemination and algorithm-driven personalization, has led to significant challenges, particularly concerning the spread of misinformation. The algorithms used by these platforms track user behavior and interactions to serve content that aligns with their interests, creating echo chambers where users are repeatedly exposed to similar viewpoints. This not only accelerates the spread of information, including misinformation, but also reinforces users' existing beliefs, contributing to societal polarization.

The issue of misinformation on social media has become increasingly prominent over the past decade. Users often share unverified information, whether intentionally or inadvertently, leading to widespread dissemination of false or misleading content. This pervasive issue has far-reaching implications, influencing public opinion and exacerbating social and political divides. Notable examples include significant political events where fake news stories on social media are believed to have impacted outcomes by spreading false information about candidates.

While some social media platforms have implemented measures to combat misinformation, such as fact-checking tools and warning labels on false content, these efforts have limitations. These measures typically do not address the root causes of misinformation, such as the speed at which content spreads and the lack of accountability for content creators. Consequently, the problem of misinformation remains a significant challenge for social media platforms and society at large.

Existing solutions to combat misinformation primarily rely on content moderation, which involves monitoring and filtering content based on predetermined rules. Actions taken against misleading content include downgrading its visibility, flagging it with warning labels, fact-checking it by adding context, deleting the content, and, in some cases, banning repeat offenders. However, these actions are often reactive and insufficient, as they fail to reach the initial viewers who were exposed to the false information.

There is a clear need for a more comprehensive solution that addresses these shortcomings. Such a solution should include mechanisms for accurately classifying content, ensuring that any misclassification can be quickly corrected, and notifying the initial viewers of any changes or corrections. Additionally, the solution should enhance the accountability of content creators and incorporate principles that promote trust and reliability in the information shared on social media platforms. By addressing these needs, it would be possible to create a more reliable and trustworthy social media environment, ultimately mitigating the impact of misinformation.

SUMMARY OF THE INVENTION

The present invention provides a system and method for aggregating, categorizing, and validating social media posts. This invention allows users to accurately classify the type of content they are creating, challenge and correct misclassified content, and ensure that corrections are visible to the initial viewers of the original content. The system incorporates a verification process that promotes accountability among content creators and leverages journalistic principles to enhance the reliability and trustworthiness of information shared on social media platforms.

The present invention offers significant advantages over existing solutions in the prior art. Unlike traditional content moderation techniques that are reactive and often fail to reach initial viewers of misleading content, this invention ensures that corrections are disseminated to those who originally viewed the erroneous information. Additionally, the invention's structured classification system helps users discern between different types of content, such as facts, opinions, research, rumors, and humor, thereby reducing the risk of misinformation. By promoting accountability and providing mechanisms for content verification, the invention fosters a more trustworthy social media environment, mitigating the impact of misinformation and enhancing the overall quality of information available to users.

The system includes a user interface that allows users to create, share, and interact with posts on a social media platform. It features a categorization module for classifying posts into various content types, and a challenge module that enables users to contest the categorization of posts. The verification module reviews and updates the categorization of challenged posts as necessary. Additionally, the system includes a notification module to inform users of changes in post categorization, a storage module to retain posts and related data, and a display module to present posts along with their categorization and verification information. This comprehensive approach ensures accurate content classification and user-driven validation, thereby enhancing the overall trustworthiness of information on the platform.

In a second aspect, wherein the categorization module may classify posts into predefined content types including facts, opinions, rumors, research, and humor.

In another aspect, the system may further comprise an accountability module configured to track user actions related to post creation, categorization, and challenges.

In another aspect, wherein the accountability module may adjust user privileges based on their history of accurate or inaccurate content classifications.

In another aspect, wherein the challenge module may allow users to provide evidence or reasons for challenging the categorization of a post.

In another aspect, wherein the verification module may consider the evidence or reasons provided by users when reviewing challenged posts.

In another aspect, wherein the notification module may notify the initial viewers of a post when its categorization has been updated.

In another aspect, wherein the storage module may store user activity logs.

In another aspect, wherein the display module may present a summary of categorization changes and verification outcomes associated with each post.

In another aspect, the system may further comprise a community-based moderation feature where selected users can participate in the verification process.

In another aspect, wherein the community-based moderation feature may include a scoring system to rank the reliability of participating users.

In another aspect, wherein the verification module may utilize automated algorithms to assist in the review of challenged posts.

In another aspect, wherein the automated algorithms may incorporate machine learning techniques to improve the accuracy of content categorization.

In another aspect, wherein the user interface may include options for users to filter and sort posts based on their categorization and verification status.

In another aspect, wherein the filter and sort options may allow users to view only posts that have been verified.

In another aspect, wherein the categorization module may allow for dynamic updating of content types based on evolving trends and user feedback.

In another aspect, wherein the dynamic updating may include adding new content types or modifying existing ones.

In another aspect, wherein the accountability module generates reports on user behavior and content trends for administrators of the social media platform.

In another implementation of the invention, a method of using this system involves providing a user interface to allow users to create, share, and interact with posts on the social media platform; categorizing each post into one or more content types using a categorization module; enabling users to challenge the categorization of posts through a challenge module; reviewing and verifying challenged posts using a verification module; updating the categorization or content of posts if necessary based on the verification; notifying users of any changes in post categorization or content via a notification module; storing posts, categorization data, challenge data, and verification outcomes in a storage module; and displaying posts and their associated categorization and verification information to users through a display module. This method enhances the reliability and trustworthiness of information on the social media platform by ensuring accurate content categorization and facilitating user-driven validation and accountability.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PREFERRED EMBODIMENT

As shown throughout the figures, the present invention 100 provides a comprehensive system and method for aggregating, categorizing, and validating social media posts, enhancing the reliability and trustworthiness of shared information. The system 100 incorporates several interconnected modules and features to ensure accurate content classification, user-driven validation, and accountability among content creators. This invention supports a dynamic and interactive social media environment where users can trust the information they encounter.

Figure 1:
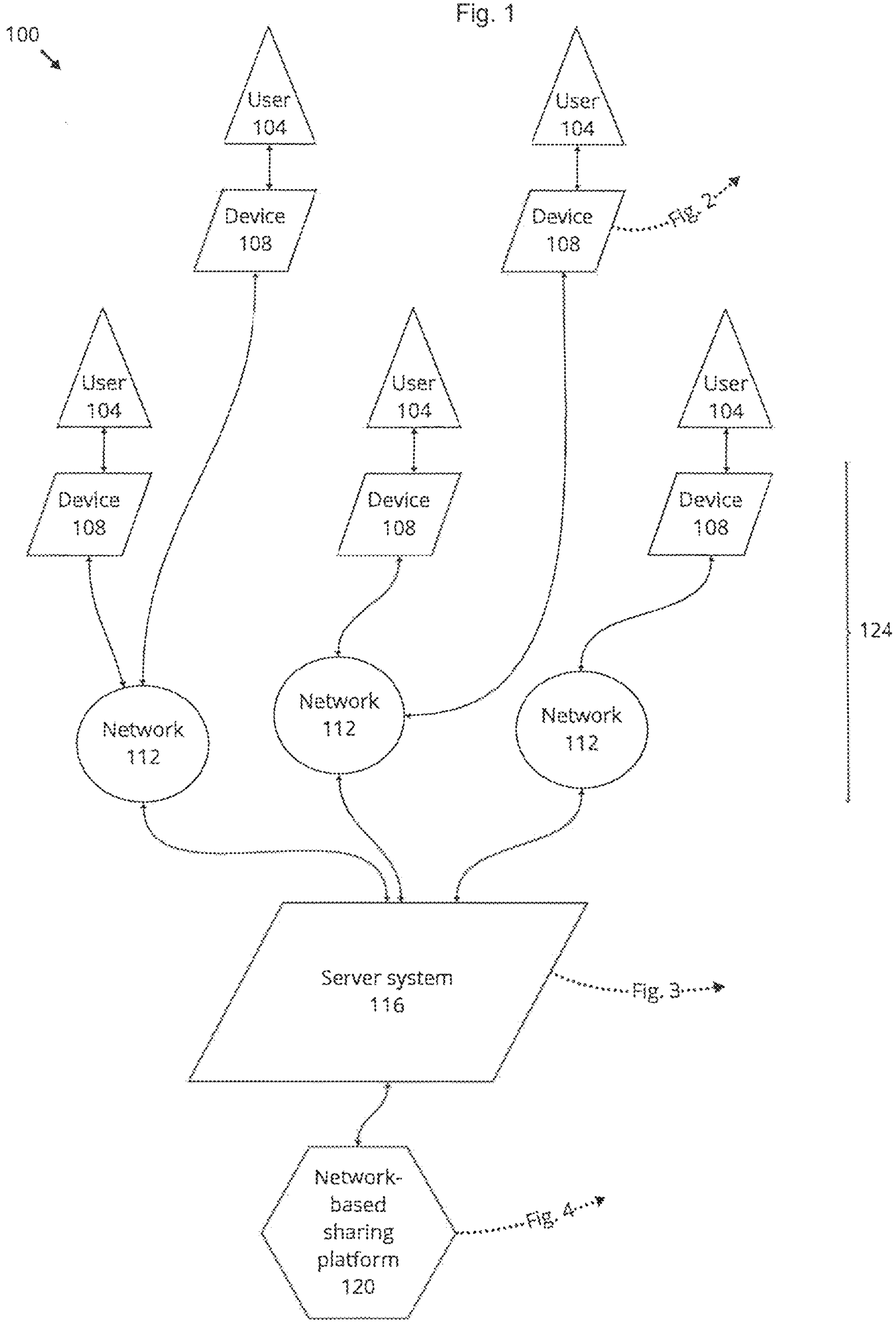
FIG. 1 illustrates the hardware environment of a network-based sharing platform, showing users accessing the platform through their devices connected to a server system via a network.

As illustrated in FIG. 1, the typical hardware environment of the network-based sharing platform 120 involves users 104 accessing the platform through their devices 108, which connect to a server system 116 via a network 112. The user interface 124 may be designed to be intuitive and user-friendly, enabling users to create, share, and interact with posts seamlessly. This interface plays an important role in facilitating user engagement and interaction on the platform.

Figure 2:
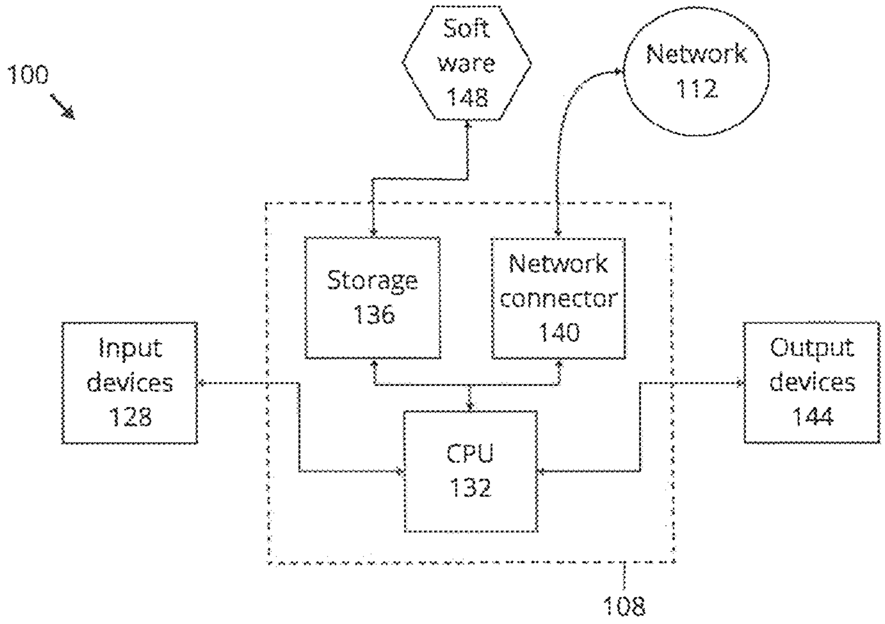
FIG. 2 illustrates the typical components of a user device, including input devices, CPU, storage, network connector, output devices, and software required to access and visualize the network-based sharing platform.

The components of a typical user device 108, as shown in FIG. 2, may include input devices 128 such as keyboards, microphones, and cameras, a CPU 132 providing processing power, storage 136 for both temporary and permanent data, a network connector 140 to connect with the network 112, output devices 144 such as screens and speakers, and software 148 required to access and visualize the platform. These components work together to ensure that users can interact with the platform efficiently and effectively.

Figure 3A:
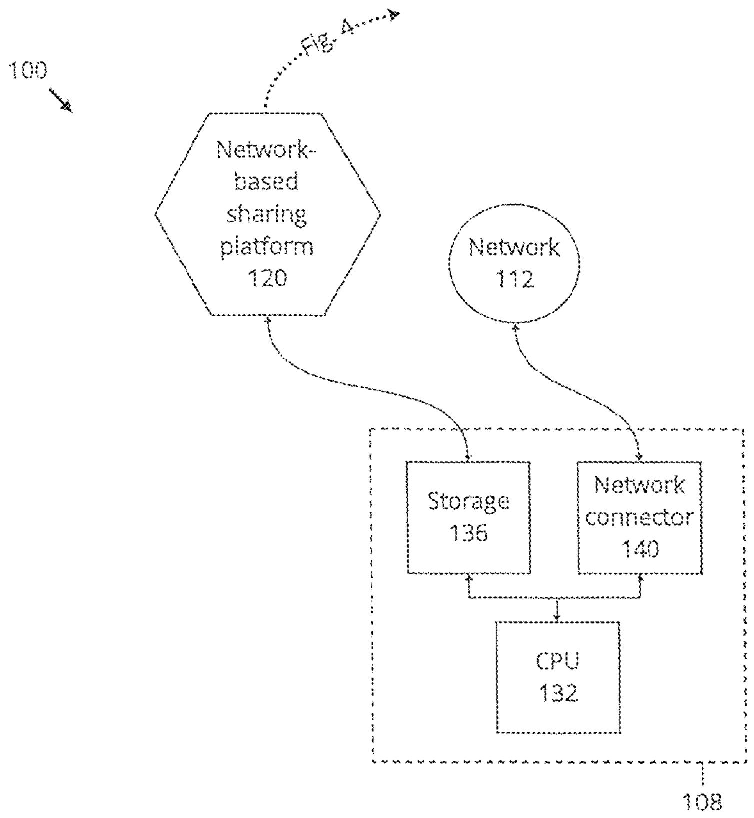
FIG. 3A illustrates a centralized server system setup, wherein one or more physical servers manage access to the network-based sharing platform, and further wherein the servers include CPUs, storage, and network connectors to facilitate this management.
Figure 3B:
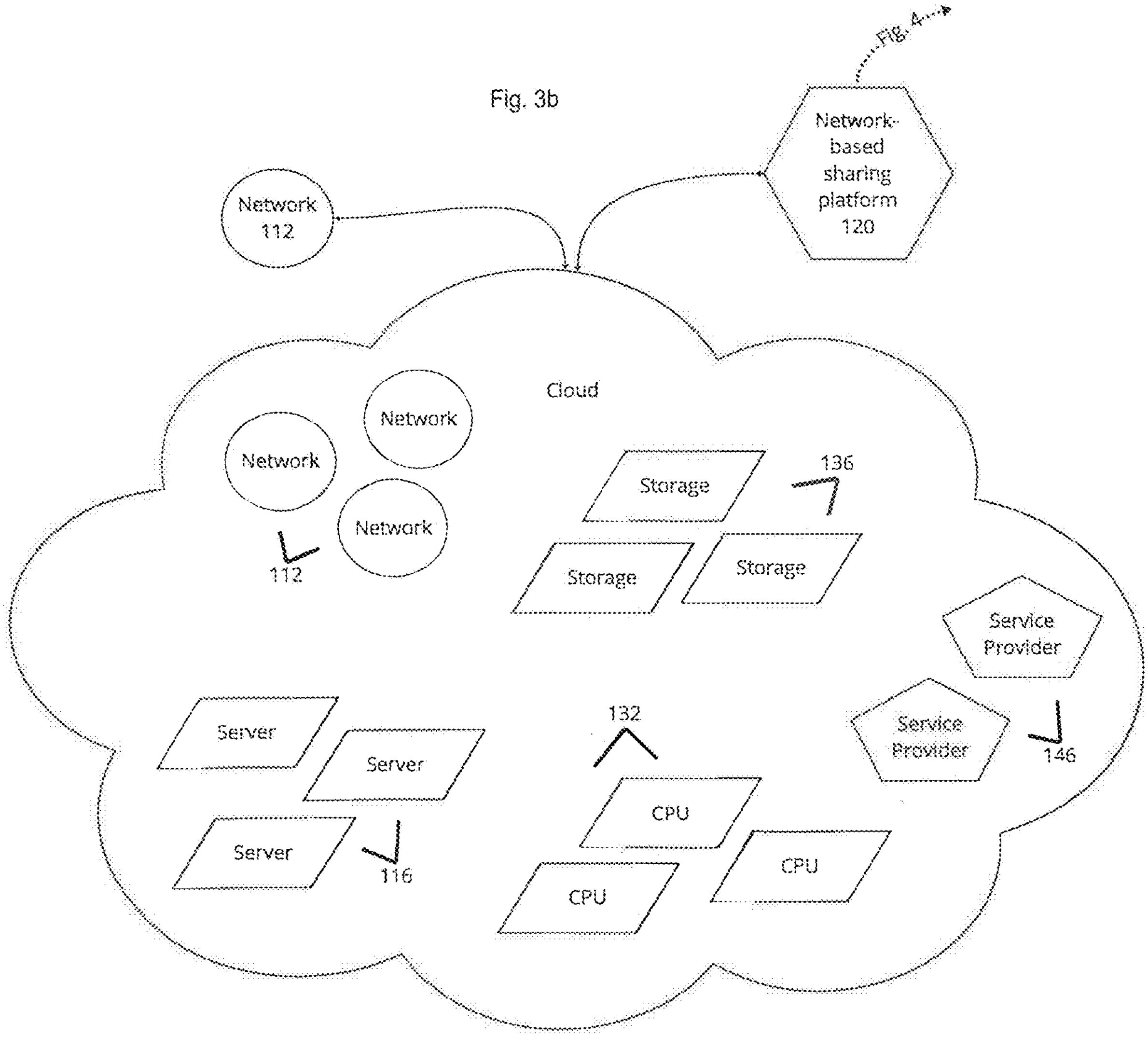
FIG. 3B depicts a decentralized server system, often referred to as a cloud-based server system, wherein the setup includes multiple interconnected servers, decentralized storage, CPUs, and third-party service providers, all linked via various networks to host and manage the network-based sharing platform.

FIG. 3A and FIG. 3B illustrate potential server system setups. In FIG. 3A, a centralized server system 116, composed of physical servers with CPUs 132, storage 136, and network connectors 140, may manage access to the platform. This setup ensures that all user requests are handled promptly and accurately. In contrast, FIG. 3B depicts a decentralized server system in the cloud, involving multiple interconnected servers 148, decentralized storage 136, CPUs 132, and third-party service providers 146. This decentralized approach leverages the scalability and flexibility of cloud computing to manage the platform more effectively. In alternate embodiments, a hybrid system may be utilized wherein part of the server system 116 may be centralized, and part may be decentralized, such as in a cloud-based setup.

Figure 4:
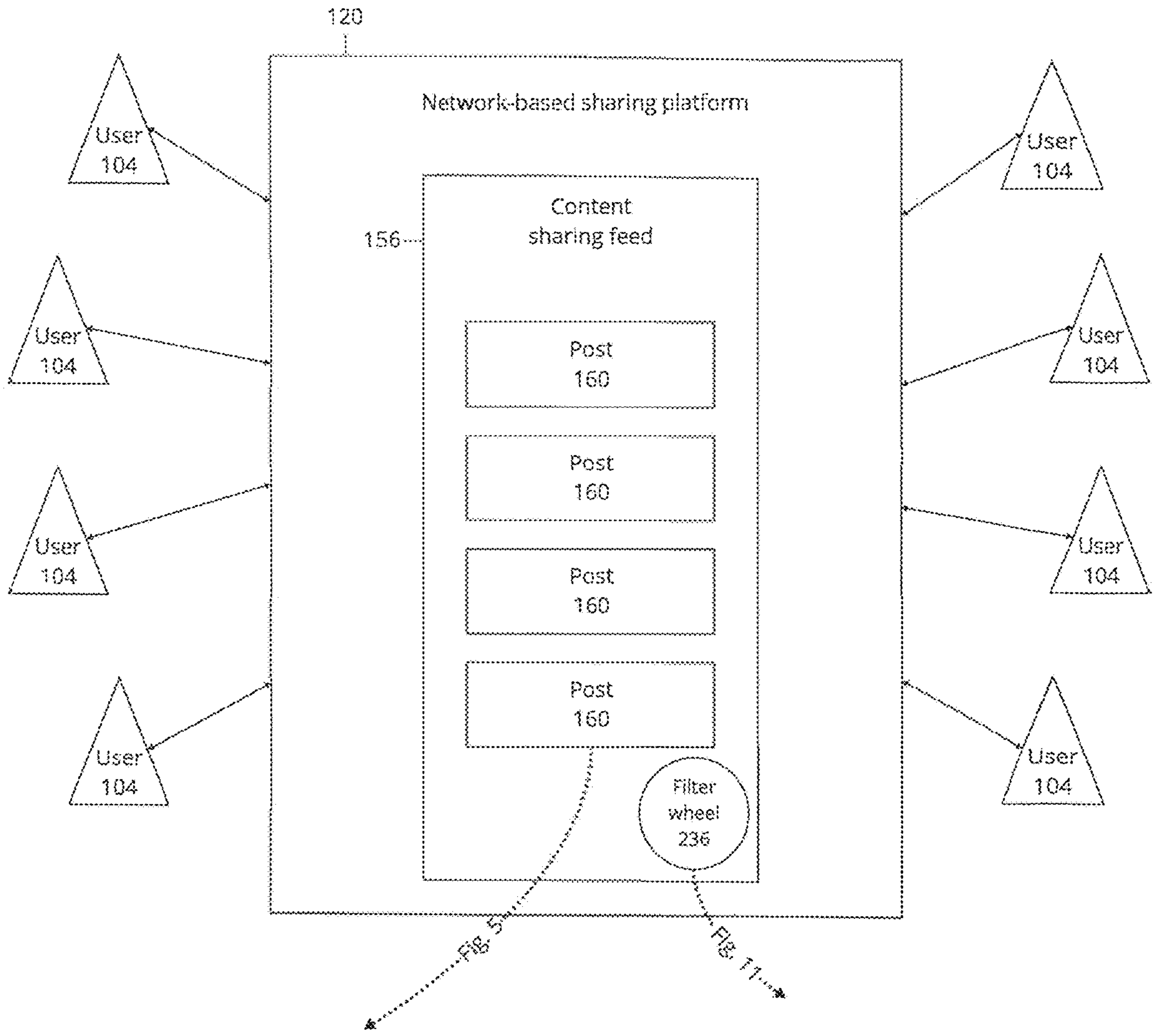
FIG. 4 illustrates the primary role of a network-based sharing platform, which connects users and allows them to post and visualize content in one or multiple content-sharing feeds, wherein users can follow or like other users, influencing the content they see, which can be filtered or categorized based on user preferences or platform algorithms.

The primary role of the network-based sharing platform 120, as depicted in FIG. 4, may be to connect users and allow them to post content in various content-sharing feeds 156. Users can follow or like other users, influencing the content displayed in their feeds. The platform May visualize posts from all users, and these feeds can be filtered or categorized based on user preferences or platform algorithms. This ensures that users can personalize their content consumption experience.

Figure 5:
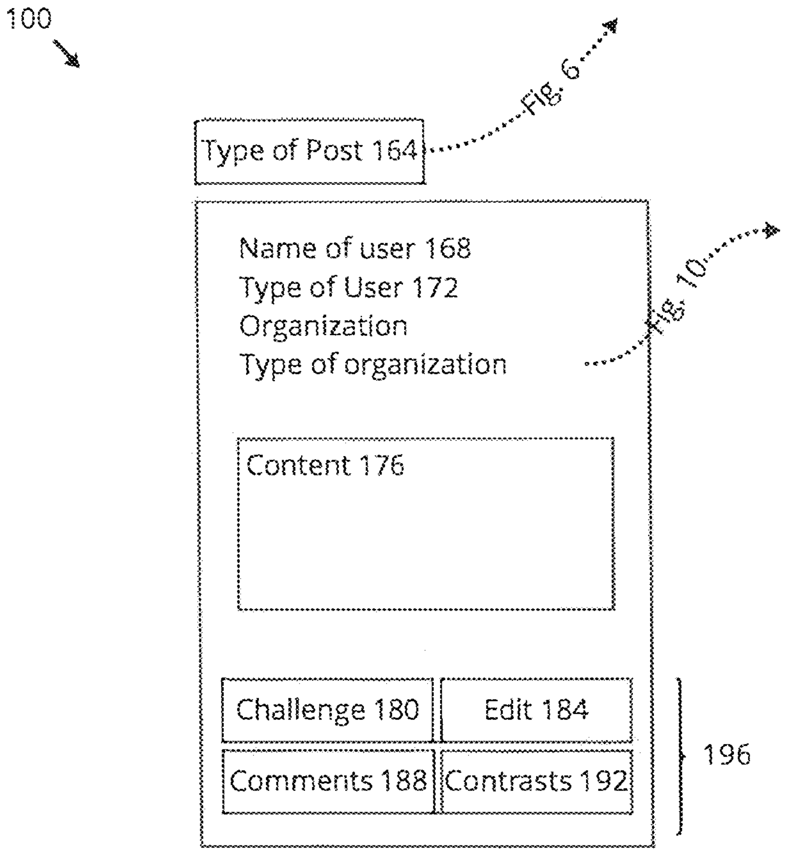
FIG. 5 illustrates the main elements of a post on the network-based sharing platform, including the type of post, name of the user, type of user, content, and buttons for challenging, editing, commenting, and contrasting the post.

FIG. 5 details the main elements of a post 160 on the platform. Each post may include the type of post 164, the name of the user 168 who created the post, the type of user 172, the content 176, and buttons for challenging 180, editing 184, commenting 188, and adding contrasts 192. Posts can also include additional information such as the name and type of organization associated with the user. The challenge module 196 enables users to contest the categorization of posts, initiating a verification process to ensure content accuracy.

Figure 6:
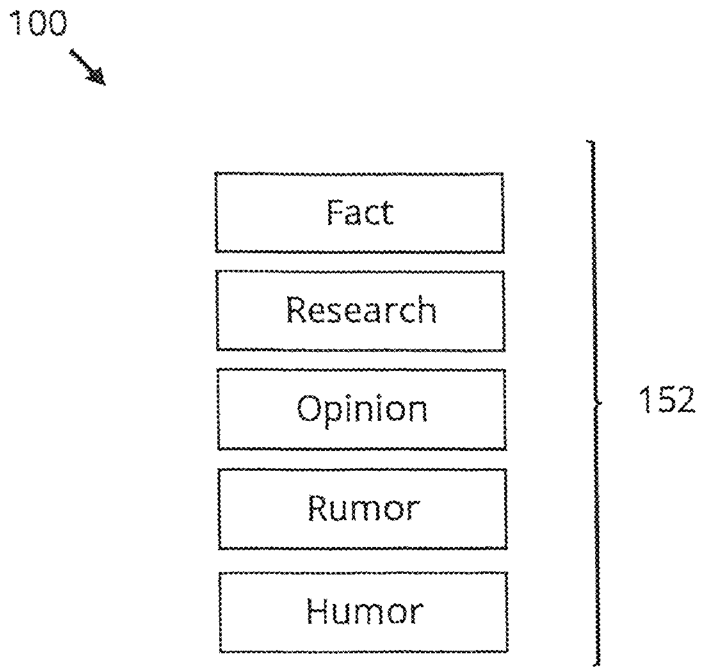
FIG. 6 illustrates the limited and non-overlapping list of types of posts, covering the entire spectrum of information, including Fact, Research, Opinion, Rumor, and Humor.

The categorization module 152, as illustrated in FIG. 6, may classify posts into predefined content types 204, including facts, research, opinions, rumors, and humor. Each type represents a different level of trust and information type. Users must select the appropriate content type when creating a post, ensuring that the content aligns with its classification. This system helps users understand the nature of the information they are consuming, reducing the risk of misinformation spreading.

Figure 7:
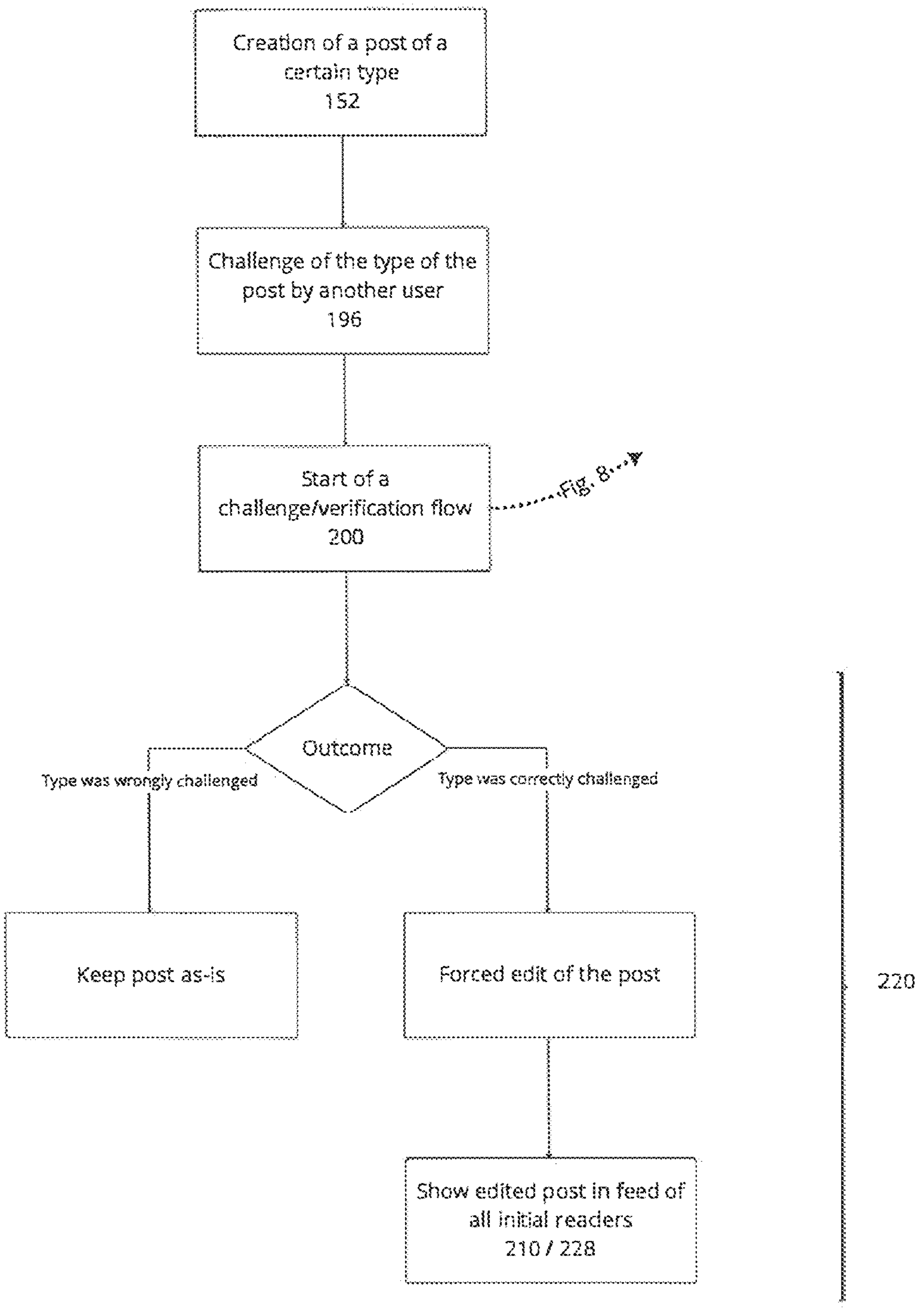
FIG. 7 illustrates the flow diagram for the process of creating, challenging, and editing posts on a network-based sharing platform, showing the steps of creating a post, challenging the post's type, initiating a verification flow, and the possible outcomes, including either keeping the post as-is or forcibly editing it.

The flow diagram in FIG. 7 presents the process of creating, challenging, and editing posts. When a post is created, it is categorized by the categorization module 152. Other users can challenge its type through the challenge module 196, initiating a verification flow 200. This flow begins with the submission of a challenge, where the challenging user provides reasons and evidence for why they believe the post's categorization is incorrect. The verification module 200 then assesses the challenge, reviewing the evidence provided and comparing it with the post's content.

The verification process may include several steps to ensure thorough evaluation. Initially, the challenge may be reviewed by an automated algorithm 220 designed to detect common issues in post categorization. This algorithm utilizes machine learning techniques to analyze patterns and trends, providing an initial assessment of the challenge's validity. If the algorithm finds merit in the challenge, the verification process proceeds to a human review phase.

Figure 8:
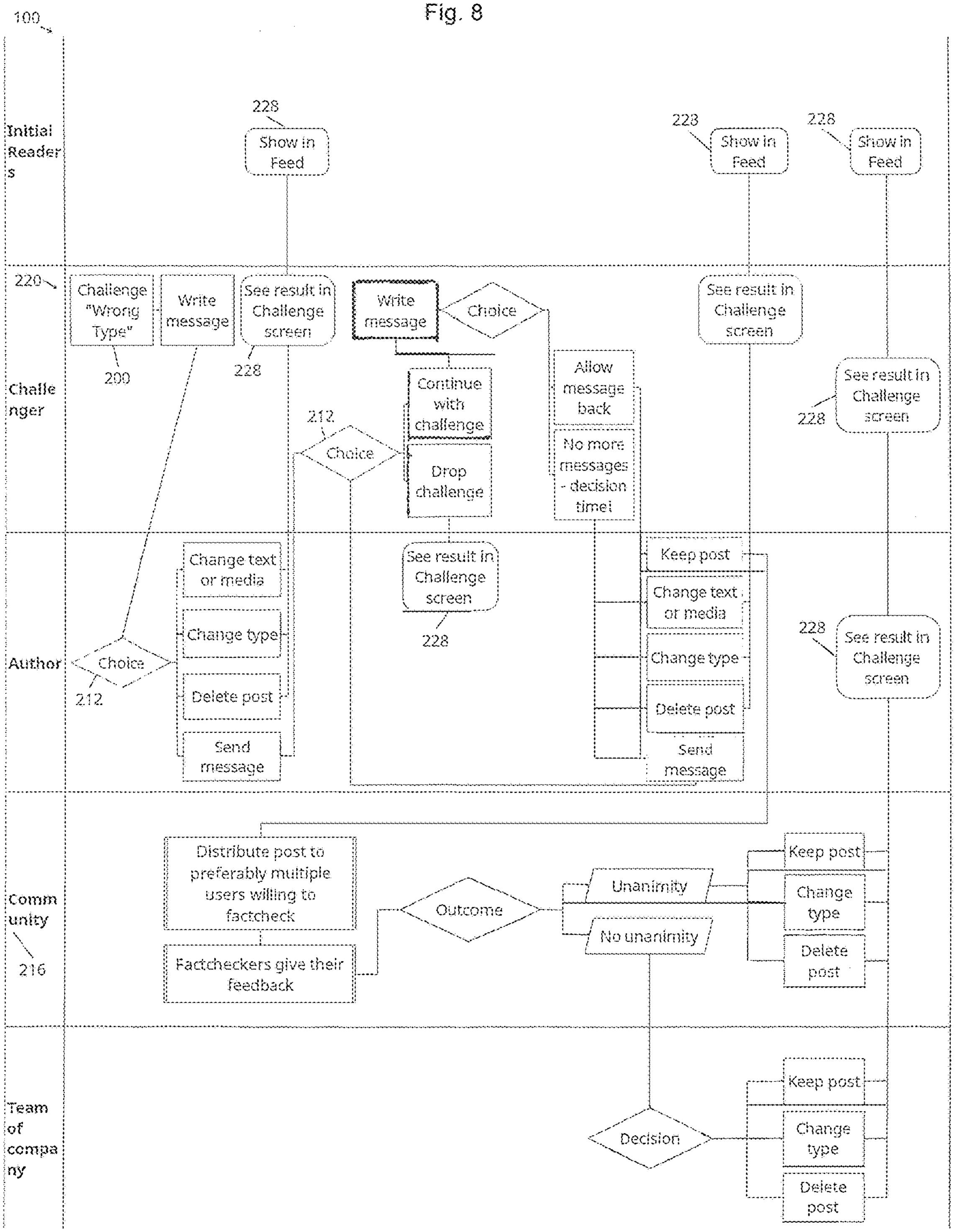
FIG. 8 illustrates a detailed example of the challenge/verification flow that starts when the type of a post is challenged by another user. It shows three possible phases: one-on-one resolution between the challenger and the author, escalation to the community, and escalation to a team appointed by the network-based sharing platform. The flow diagram outlines the possible outcomes and forced edits, as well as how these edits are shown to the initial readers of the post.

In the human review phase, designated reviewers, which may include community moderators 216 or platform-appointed experts, examine the post and the provided evidence in detail, as best shown in FIG. 8. These reviewers assess whether the post's content aligns with its original categorization. They consider various factors, including the context of the content, the nature of the evidence, and the credibility of the sources cited by the challenging user. This thorough review ensures that the verification process is both comprehensive and accurate.

The outcomes of the verification process, as shown in FIG. 7, can vary. If the challenge is found to be unwarranted, the post remains unchanged. However, if the challenge is validated, the post may be edited to reflect the correct categorization. This could involve changing the categorization of post to better match its content or providing additional context to clarify its nature. Alternatively, the content of the post may be changed to accurately reflect the categorization. The notification module 208 then informs both the original poster and the challenging user of the outcome, along with any changes made to the post.

FIG. 8 provides a detailed example of the challenge/verification flow, showing the different phases and possible outcomes. The process is divided into three main phases: one-on-one resolution, community escalation, and platform-appointed team review. In the first phase, the challenger and the post's author engage directly, attempting to resolve the issue through dialogue. If they reach an agreement, the post is either maintained as-is or edited based on their consensus. If the initial phase does not resolve the challenge, the process escalates to the community phase. In this phase, the challenge is reviewed by a group of selected community members 216 who vote on the validity of the challenge. This community-based moderation introduces a democratic element to the verification process, leveraging the collective judgment of multiple users. The scoring system ranks the reliability of participating community members, ensuring that the most credible users have a greater influence on the outcome.

Should the community phase fail to resolve the issue, the challenge escalates to the final phase, where a team appointed by the network-based sharing platform 120 reviews the challenge. This team comprises experts in content moderation and verification, providing a final and authoritative assessment of the post's categorization. They consider all evidence and previous reviews, ensuring a thorough and conclusive resolution.

The possible outcomes in each phase of the challenge/verification flow include maintaining the post's current categorization, editing the post to reflect a different categorization, or deleting the post if it is deemed inappropriate or misleading. Additionally, any forced edits or deletions are logged and stored in the storage module, providing a record of the verification process and maintaining transparency.

Figure 9:
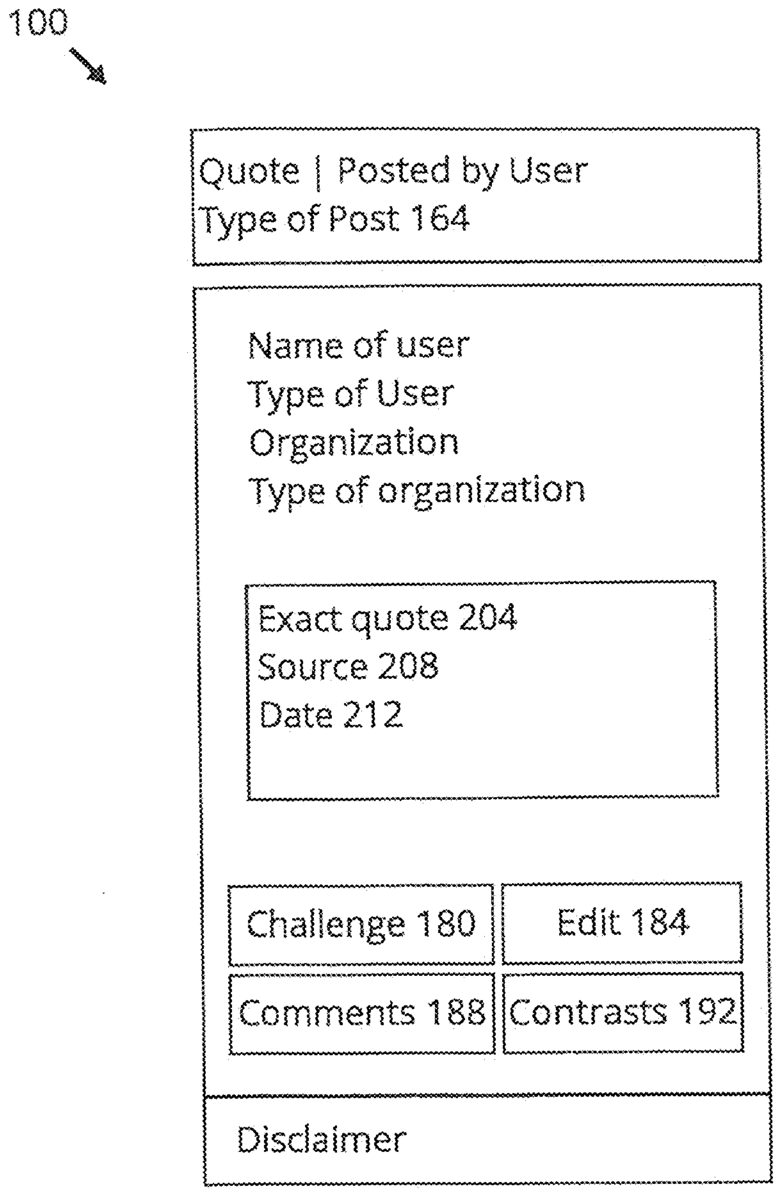
FIG. 9 illustrates a Quote, a special type of post created by a user on the network-based sharing platform to display an exact quotation from someone else, including the type of post, name of the quoted person, exact quote, source, date, and user who posted the quote, along with options for challenging, editing, commenting, and adding contrasts, and a disclaimer regarding the quoted user's association with the platform.

A Quote post, as shown in FIG. 9, is a special type of post created by a user to display an exact quotation from someone else. It includes the type of post 164, name of the quoted person 168, exact quote 204, source 208, date 212, and user who posted the quote 216. Users can challenge the accuracy of the quote, source, or date, or edit these details if necessary. Comments and contrasts can also be added, providing a comprehensive view of the information shared.

Figure 10:
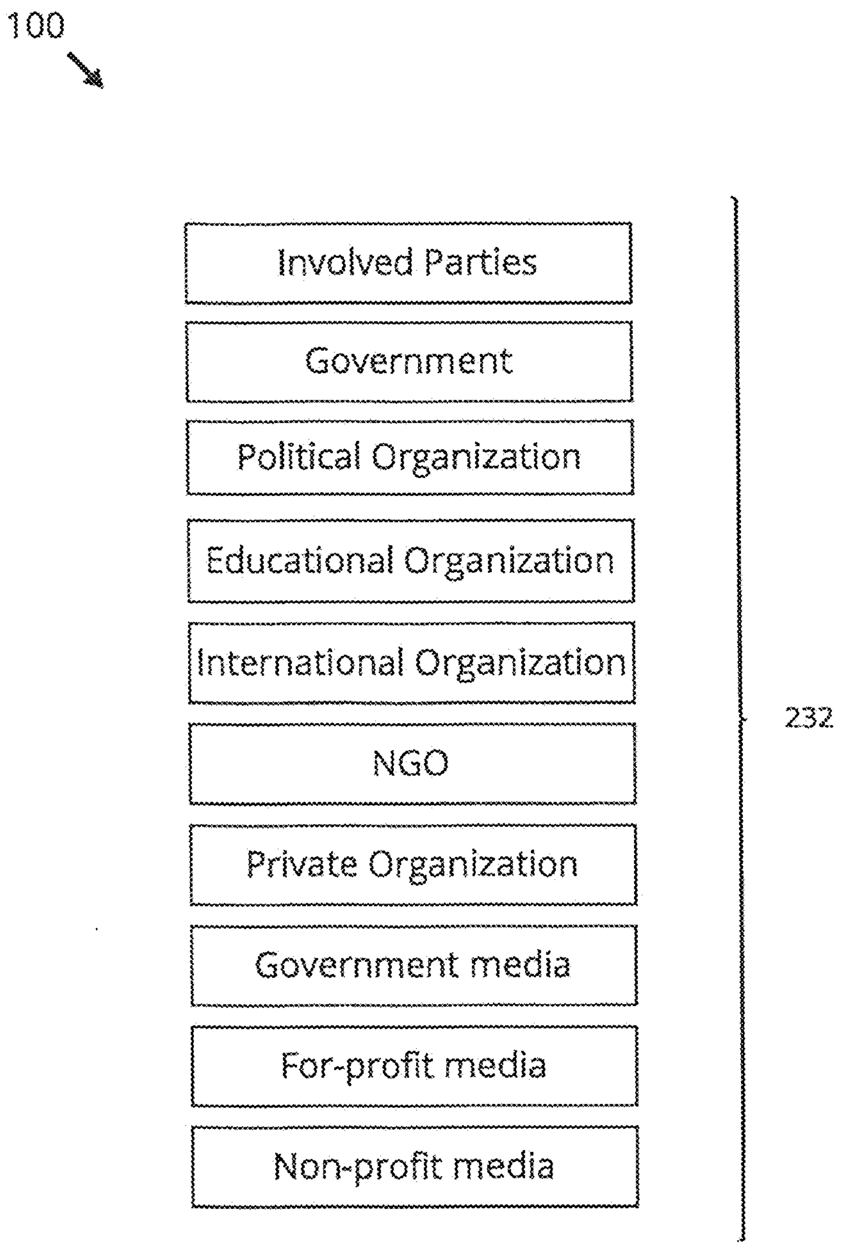
FIG. 10 illustrates the types of organizations, a limited and non-overlapping list that describes the nature or involvement of an organization in a topic, allowing for easy filtering in the filter wheel across the platform.

The types of organizations, illustrated in FIG. 10, form a limited and non-overlapping list that describes the nature or involvement of an organization 232 in a topic, allowing for easy filtering in the filter wheel. This categorization includes types such as government, political organization, educational organization, and others. Users can filter content based on the type of organization, ensuring that they see relevant and trustworthy information.

Figure 11:
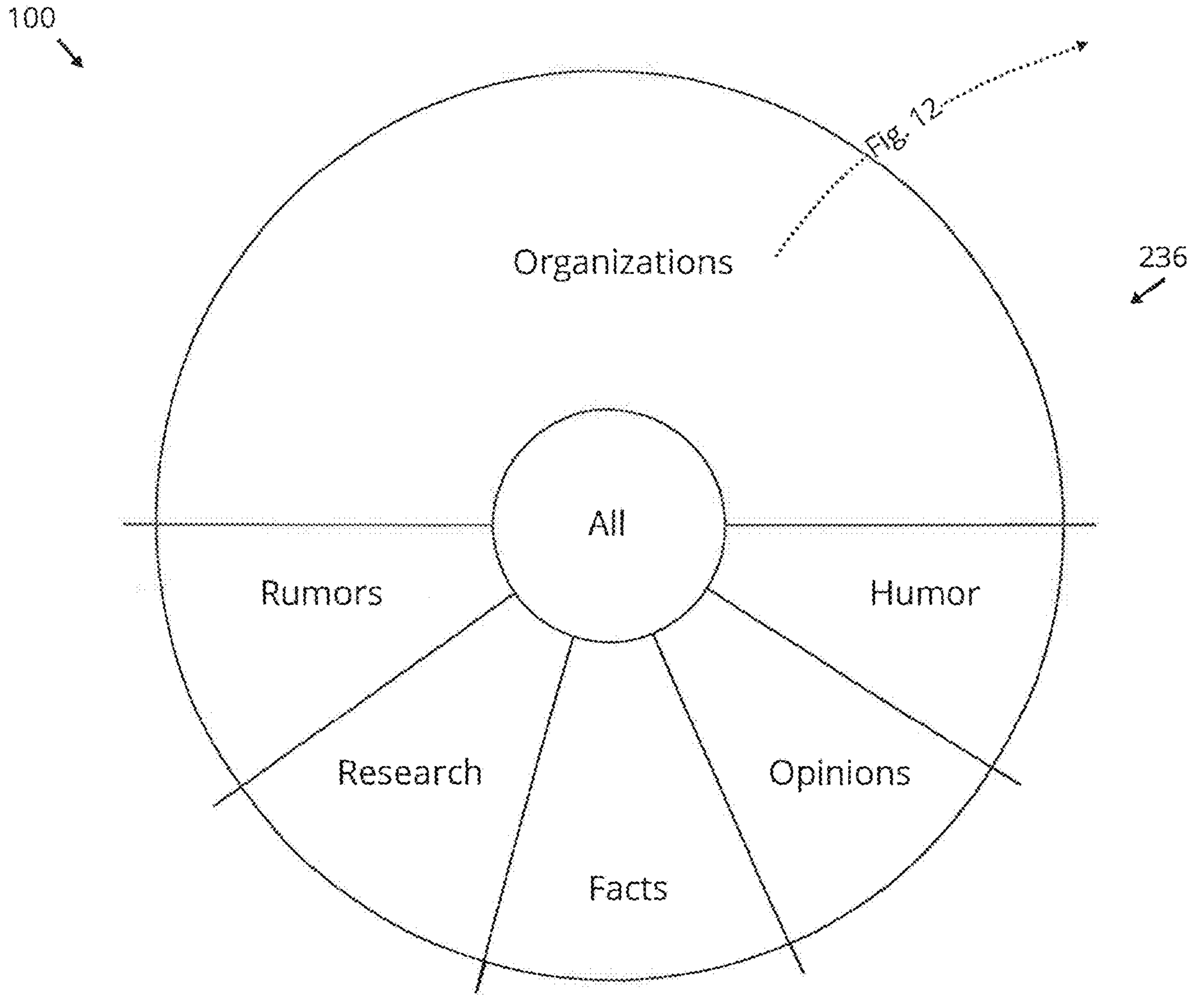
FIG. 11 illustrates a filter wheel visualization in a content sharing feed, allowing users to choose which types of posts and/or posts from which organizations they want to see, with options to filter by types such as rumors, research, facts, opinions, humor, or to view all posts.

The filter wheel 236 visualization in FIG. 11 enables users to choose which types of posts and organizations they want to see in their content-sharing feeds. This feature allows for personalized content consumption, enhancing the user experience. Users can filter by content type or organization, tailoring their feeds to match their interests and preferences.

Figure 12:
FIG. 12 illustrates the filter wheel layout for selecting types of organizations, allowing users to filter content based on the organization's type, with options such as government, political organization, educational organization, and others, accessed by clicking on the "Organizations" button in the filter wheel.

FIG. 12 demonstrates the filter wheel 236 layout for selecting types of organizations 240. Users can click on the "Organizations" button to filter content by organization type. This feature helps users find content related to specific organizations, providing a more focused and relevant information stream.

The accountability module 212 may track user actions related to post creation, categorization, and challenges. This module may adjust user privileges based on their history of accurate or inaccurate content classifications, promoting responsible behavior on the platform. Users with a history of accurate classifications may receive more privileges, while those with a history of inaccuracies may have their privileges reduced.

The community-based moderation feature 216 allows selected users to participate in the verification process. This feature may include a scoring system to rank the reliability of participating users, ensuring that only trusted users are involved in content verification. Community moderation promotes a collaborative approach to content validation, enhancing the overall reliability of the platform.

Automated algorithms 220 may assist in the review of challenged posts, incorporating machine learning techniques to improve the accuracy of content categorization. These algorithms analyze patterns and trends in user behavior and post content, providing more precise and efficient verification. The use of machine learning enhances the system's ability to manage large volumes of content and detect potential misinformation.

The storage module may retain posts, categorization data, challenge data, and verification outcomes. This module ensures that all relevant information is preserved for future reference, supporting transparency and accountability. User activity logs are also stored, providing a record of user behavior and interactions on the platform.

The display module 228 presents posts and their associated categorization and verification information to users. This module ensures that users have access to accurate and up-to-date information, enhancing the overall user experience. Summaries of categorization changes and verification outcomes are displayed, providing a clear view of the content's history and validation status.

As best shown throughout the figures, the notification module 210 informs users of changes in post categorization, ensuring that they are aware of any updates or corrections. This module helps maintain transparency and trust on the platform, as users can see how content evolves and is verified over time. Notifications are sent to initial viewers of the post, ensuring that they are informed of any changes.

The categorization module 152 allows for dynamic updating of content types based on evolving trends and user feedback. New content types can be added or existing ones modified, ensuring that the classification system remains relevant and effective. This flexibility allows the platform to adapt to changing user needs and emerging trends in content creation.

The method of using the system involves several steps. Users create, share, and interact with posts on the platform. Each post may be categorized into one or more content types using the categorization module 152. Users can challenge the categorization of posts through the challenge module 196. The verification module 200 reviews and verifies challenged posts, updating their categorization if necessary. Users are notified of any changes in post categorization via the notification module 210. Posts, categorization data, challenge data, and verification outcomes are stored in the storage module. Posts and their associated categorization and verification information are displayed to users through the display module 228.

The invention's structured classification system helps users discern between different types of content, such as facts, opinions, rumors, and humor. This reduces the risk of misinformation and promotes accountability among content creators. By providing mechanisms for content verification, the invention fosters a more trustworthy social media environment, mitigating the impact of misinformation and enhancing the overall quality of information available to users. The system enhances the reliability and trustworthiness of information on the social media platform. Accurate content classification and user-driven validation are ensured, fostering a more reliable social media environment. The invention provides a comprehensive approach to content aggregation, categorization, and validation, addressing the shortcomings of existing solutions in the prior art.

The invention supports a dynamic and interactive social media environment. Users can create, share, and interact with posts, challenge and correct misclassified content, and ensure that corrections are visible to the initial viewers of the original content. The verification process promotes accountability among content creators, leveraging journalistic principles to enhance the reliability and trustworthiness of shared information.

The system includes options for users to filter and sort posts based on their categorization and verification status. Users can view only verified posts, ensuring that they consume reliable information. The categorization module allows for dynamic updating of content types based on evolving trends and user feedback. This ensures that the classification system remains relevant and effective.

The invention's accountability module 212 generates reports on user behavior and content trends for administrators of the social media platform. These reports provide valuable insights into user interactions and content dissemination, supporting informed decision-making and platform management. The system's comprehensive approach to content aggregation, categorization, and validation enhances the overall quality of information available to users.

The invention addresses the root causes of misinformation by providing mechanisms for accurate content categorization and user-driven validation. This fosters a more trustworthy social media environment, mitigating the impact of misinformation and enhancing the overall quality of information available to users. The system's structured classification, verification, and accountability processes ensure that users have access to reliable and trustworthy information on the platform.

In some embodiments, the system may include additional features to enhance functionality. For example, the user interface 124 may support multi-language capabilities, allowing users to interact with the platform in their preferred language. The verification module 200 could be integrated with external fact-checking services to provide additional layers of validation. The platform may also include advanced analytics tools to monitor content trends and user behavior, providing administrators with deeper insights into platform usage. Furthermore, the system could support integration with other social media platforms, enabling seamless content sharing and verification across multiple networks.

In alternate embodiments of the present invention, various modifications and enhancements can be made to improve user interaction and system functionality. One possible embodiment includes a notification feature where users are alerted when their post receives a challenge. The user would then have a predetermined period within which they must modify the post to retain its original categorization. If the user successfully updates the post to address the challenge within this time frame, the post may remain in its initial category. Another embodiment could involve enhanced integration with external fact-checking services, allowing the verification module to leverage third-party validation for more accurate content categorization. Additionally, the system could support multi-language interfaces, enabling a broader user base to interact with the platform in their preferred language. Further, the invention might incorporate advanced analytics tools to monitor content trends and user behavior, providing administrators with deeper insights for better platform management.

In summary, the present invention 100 offers a robust and comprehensive system for aggregating, categorizing, and validating social media posts. By incorporating multiple interconnected modules and leveraging advanced technologies, the system enhances the reliability and trustworthiness of shared information. This invention supports a dynamic and interactive social media environment, promoting accountability among content creators and fostering a more trustworthy and informative platform for all users.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A computer-implemented system comprising a processor operatively coupled to a memory for aggregating, categorizing, and validating social media posts comprising:

a user interface configured to allow a post author to create a post on a social media platform and assign the post, at a time of creation of the post, to exactly one content type from a predefined set of mutually exclusive content types comprising fact, research, opinion, rumor, and humor;

a challenge module configured to receive, from a challenger different from the post author, a challenge to the content type assigned to the post, the challenge including a justification and optionally supporting evidence;

a verification module configured to in response to receipt of the challenge, initiate a sequential multi-phase review workflow comprising:

(i) a one-to-one peer validation step between the challenger and the post author, (ii) after completion of the one-to-one peer validation step, a community-based validation step involving a subset of users selected according to respective reliability scores of the users, and (iii) after completion of the community-based validation step, a platform moderation step is performed by a platform-appointed review team, wherein each of the one-to-one peer validation step, the community-based validation step, and the platform moderation step generates validation feedback, and wherein a post classification of the post is modified based on the validation feedback generated during the sequential multi-phase review workflow;

an accountability module configured to track user actions associated with the post creation, the post classification, challenge participation, and validation decisions, and further configured to update a reliability score for each user based on whether prior post classifications and prior validation decisions of the user correspond to a final post classification determined in the platform moderation step;

a community-moderation module configured to select, rank, and invite the subset of users to participate in the community-based validation step according to updated reliability scores generated by the accountability module, and to restrict participation in the community-based validation step to users satisfying a predetermined reliability condition;

a notification module configured to notify the post author and the challenger of any modified post classification resulting from the sequential multi-phase review workflow;

a storage module configured to store the post, the content type assigned to the post, the challenge, the validation feedback generated during the sequential multi-phase review workflow, the modified post classification, and the updated reliability scores; and a display module configured to present the post, the content type assigned to the post, the modified post classification, and a verification status of the post to users on the social media platform.

2. The system of claim 1, wherein the verification module considers the evidence or reasons provided by users when reviewing challenged posts.

3. The system of claim 1, wherein the storage module stores user activity logs associated with the post creation, the post classification, and the challenge participation.

4. The system of claim 1, wherein the user interface includes options for users to filter and sort posts based on their categorization and the verification status.

5. The system of claim 4, wherein the filter and sort options allow users to view only posts that have been verified.

* * * * *